July 19, 1932. H. E. PATRICK ET AL 1,867,754
TRANSFORMER CONVERTER
Filed June 14, 1930 2 Sheets-Sheet 1

Inventors
Harry E. Patrick
and Irven W. Kureth
Barnet A. Truman
By Attorneys.

July 19, 1932.   H. E. PATRICK ET AL   1,867,754
TRANSFORMER CONVERTER
Filed June 14, 1930   2 Sheets-Sheet 2

Inventors
Harry E. Patrick
and Irven W. Kureth
Barrett & Truman
Attorneys.

Patented July 19, 1932

1,867,754

UNITED STATES PATENT OFFICE

HARRY E. PATRICK, OF OCOEE, AND IRVEN WILLIAM KURETH, OF ORLANDO, FLORIDA, ASSIGNORS OF ONE-THIRD TO WILLIAM F. ANDERSON, OF WISCONSIN RAPIDS, WISCONSIN; LENA M. PATRICK EXECUTRIX OF SAID HARRY E. PATRICK, DECEASED

TRANSFORMER-CONVERTER

Application filed June 14, 1930. Serial No. 461,153.

This invention relates to certain new and useful improvements in a transformer converter particularly adapted to transform current from an alternating current source and convert this current into direct current of constant but adjustable voltage.

According to this invention, both of the main transformer elements are simple and stationary, and the apparatus only necessitates the use of a single rotary element which is comparatively small and light in weight. By a simple angular adjustment of one of the smaller stationary parts, the voltage of the direct current taken off may be varied.

The principal object of this invention is to provide an improved transformer converter of the type briefly referred to hereinabove, and disclosed more in detail in the specifications which follow.

Another object is to provide an improved form of transformer converter embodying few moving parts, and which is simple and efficient in operation.

Another object is to provide improved means for adjusting the voltage of the direct current delivered from the machine.

Another object is to provide improved means for enclosing and supporting the assembly and for surrounding the stationary transformer elements with a bath of oil for insulating and cooling purposes.

Another object is to provide a transformer converter embodying a stationary commutator and rotary brushes adapted to collect and transmit direct current from the machine.

Other objects and advantages of this invention will be more apparent from the following detailed description of one approved form of apparatus embodying the principles of this invention.

Figure 1:
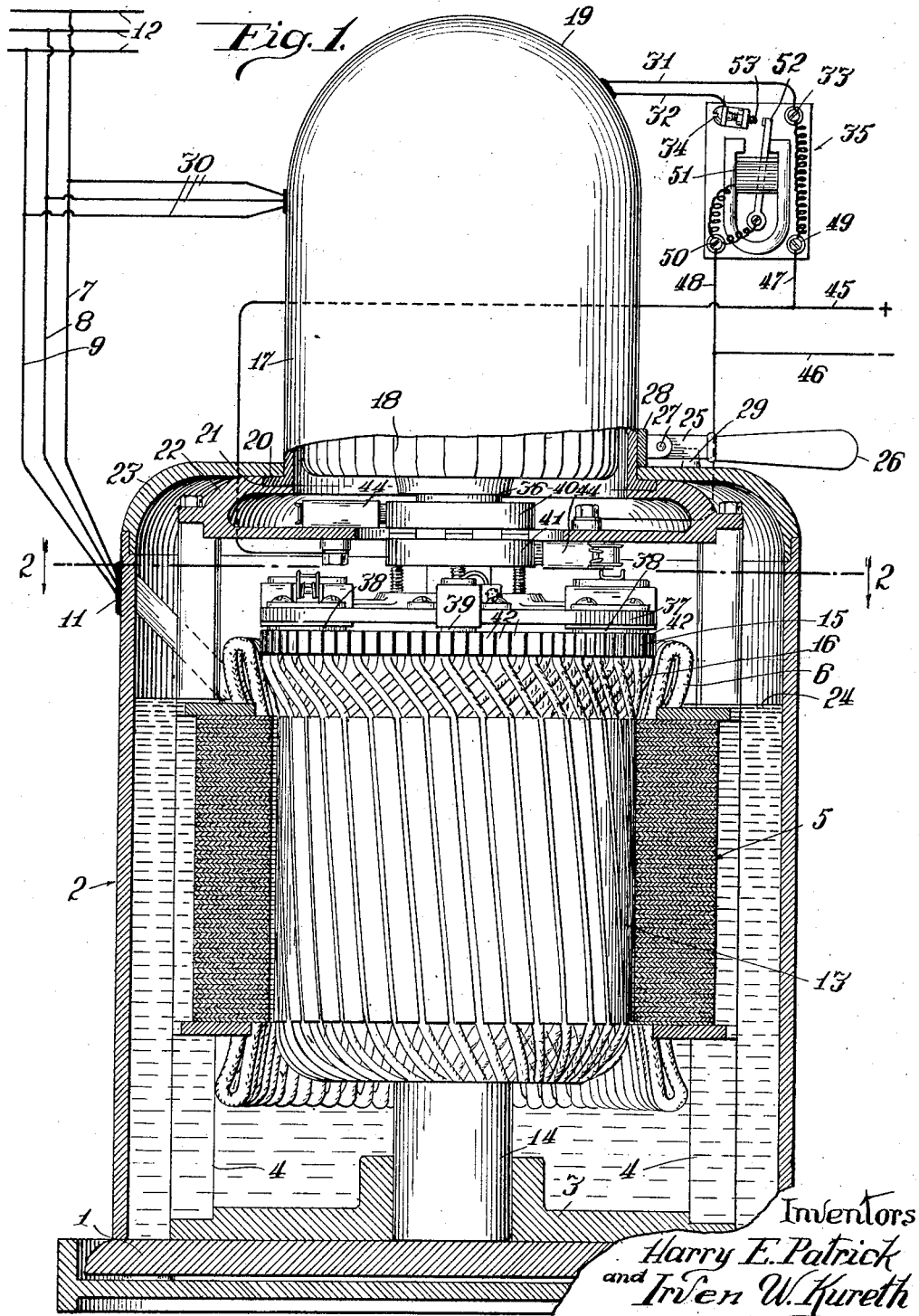
Fig. 1 is a partial elevation and partial central vertical section through the machine.
Figure 2:
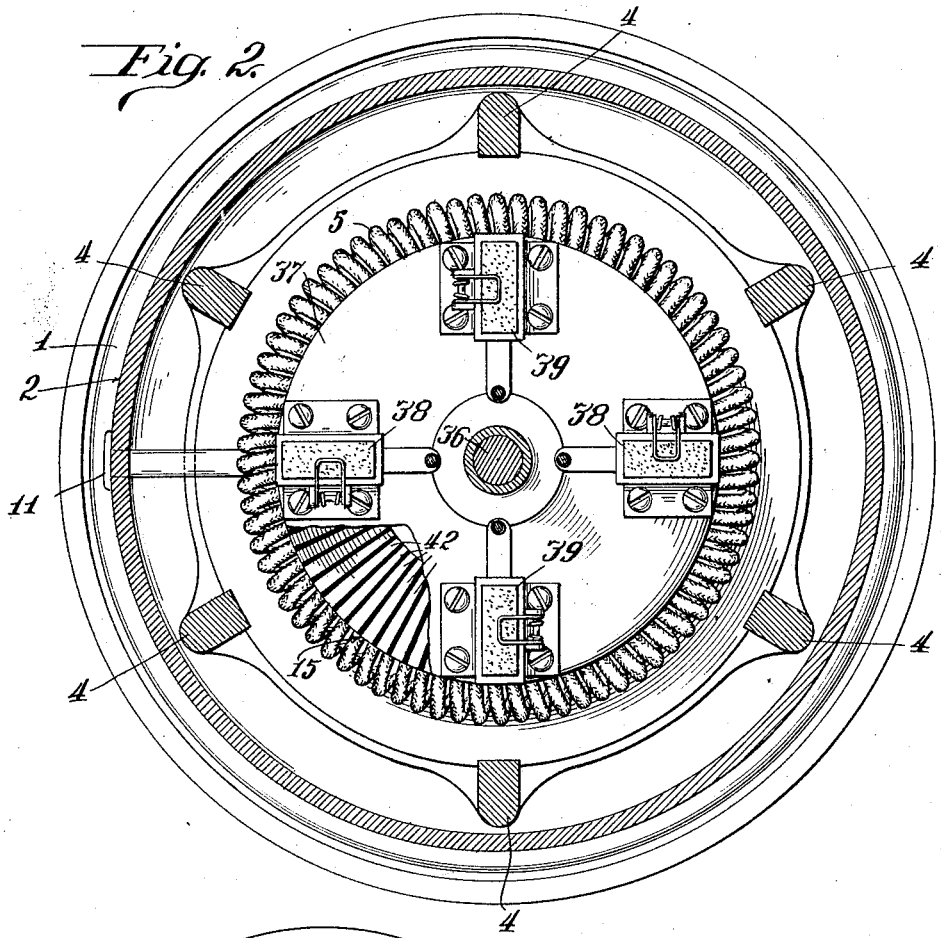
Fig. 2 is a horizontal section, taken substantially on the line 2—2 of Fig. 1.
Figure 3:
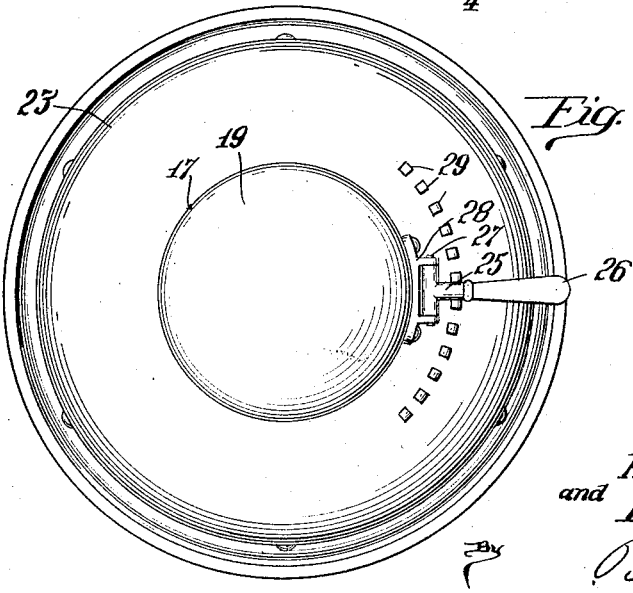
Fig. 3 is a plan view on a smaller scale.

The frame structure comprises a supporting base 1 and an outer substantially cylindrical shell or casing 2, which inclose the supporting plate 3 and uprights 4. Between these uprights 4 is mounted the annular stator element 5 of the transformer. In the present example this stator element 5 is in the form of an alternating current actuated field element, provided with a four-pole three-phase winding, supplied with current through the conductors 7, 8 and 9 leading into the casing 2 at 11, and connecting with a source of polyphase alternating current indicated generally at 12. When supplied with 60 cycle alternating current, this field element 5 will create a revolving magnetic field of four poles, rotating at 1800 revolutions per minute. It is to be understood that the stator element just described is merely given by way of example and that other types of windings could be used.

Inside the stator field 5 is positioned a second stationary element 13 in the form of an armature wound similarly to the armature of a direct-current motor or generator. Since neither of the elements 5 or 13 rotate, the armature element 13 may be fitted snugly within the field member 5. As here shown, the armature element 13 is supported from a post or pedestal 14 set in the supporting plate 3. A flat commutator 15 is mounted above and supported by the armature 13, the several armature windings 16 being separately connected to the commutator segments in the usual manner.

The outer casing 17 of a small synchronous motor indicated generally at 18, has a closed upper end 19 and an open lower end provided with an outwardly extending supporting flange 20 which fits within an annular groove or channel 21 in the frame member 22 carried by the upper ends of the uprights 4. The cover plate 23 of the lower shell 2 serves to complete the inclosure of the transformer mechanism, and also extends over flange 20 so as to hold the synchronous motor mechanism in position. The lower shell 2 may be filled with any suitable transformer oil up to the level indicated approximately at 24.

A latch member 25 provided with handle 26 and pivoted at 27 in the bracket 28 secured to the lower portion of motor casing 17, is adapted to be selectively engaged between any two of an arcuate series of lugs 29 formed on the cover plate 23 of the transformer casing. By raising the handle 26 and shifting same to one side or the other, the motor assembly, or at least the outer element thereof may be angularly adjusted about the common central vertical axis of the motor and transformer units, but will be fixedly held in this adjusted position when the latch member 25 is again pushed down between any selected pair of lugs 29.

The synchronous motor 18 may be of the type disclosed in the copending application of Patrick & Kureth, Serial No. 365,086, filed May 22, 1929, although many other types of synchronous motors now well known in the art could be used for the purpose hereinafter disclosed. One element of this synchronous motor is supplied with alternating current from source 12 through the leads indicated at 30, whereas another relatively rotating element of the motor is supplied with direct current through the wires 31 and 32 leading from the binding posts 33 and 34, respectively, of the relay 35, hereinafter described.

The rotary element of this synchronous motor, the end of which is indicated generally at 36, carries a cage or brush holder indicated at 37, on which are mounted a series of brushes 38 and 39, and a pair of slip rings 40 and 41. The brushes are adapted to engage and rotate upon the upper plane surfaces of the segments 42 of commutator 15, one opposite pair of brushes 38 always being of the same polarity, for example positive, and connected to one slip ring such as 40, whereas the opposite pair of brushes 39 will be of opposite polarity, for example negative, and connected to the other slip ring 41. Fixed brushes 43 and 44, mounted in the supporting frame member 22, are adapted to constantly take off direct current from the slip rings, which current may be delivered from the transformer through the wires indicated at 45 and 46.

A shunt circuit from this direct current output line leads through wires 47 and 48 to the binding posts 49 and 50 of the relay 35 for the purpose of energizing one of the elements of the synchronous motor 18. This relay 35 functions to keep the direct current mains at a permanent polarity. This relay includes a magnet coil 51 which is shunted across the direct current line between the binding posts 49 and 50. When the binding posts 49 and 50 are of the proper polarity, for example positive and negative respectively, the current will flow through coil 51 in the proper direction to maintain the pivoted armature 52 in engagement with fixed contact 53, thereby completing the shunt circuit through the synchronous motor, since the connection between wires 48 and 32 is made through armature 52. If, when the apparatus is started up, the brushes should pick up the direct current in such manner that the output leads 45 and 46 should be of reversed polarity, that is lead 45 should be negative and lead 46 positive, the current will flow through coil 51 in the reverse direction and armature 52 will be drawn away from fixed contact 53 so as to break the circuit through the sychronous motor. The rotating element of the synchronous motor is adapted to rotate in synchronous speed with the rotating field set up by transformer element 5, in other words at 1800 revolutions per minute in the example first given. This will cause the two sets of brushes 38 and 39 to remain of constant polarity, that is for example brushes 38 will continuously pick up positive current and brushes 39 negative current. If the machine should start up with brushes 38 of opposite or negative polarity, the relay 35 will operate to break the circuit to the synchronous motor, which will slip from synchronous speed thus causing a vibrating movement of armature 51 due to the difference between the speed of the rotating brushes and the rotating field of the transformer. This vibrating movement is only momentary since as soon as the brushes are of proper polarity and the current flows in the proper direction through coil 51, the armature 52 will be permanently held against the contact 53 so as to complete the shunt circuit through the synchronous motor in the proper direction. Should the polarity of the brushes be correct when the machine is started, the contacts 51 and 52 of relay 35 will remain closed from the start.

When the outer field element of the synchronous motor is shifted by means of the adjusting lever 26, the angular relation between the fields of the synchronous motor and of the transformer is changed, which is the equivalent of shifting the brushes on the commutator. This enables the voltage of the direct current output to be varied between certain maximum and minimum points, and when the synchronous motor is again locked in position by the latch 25 this voltage will remain constant.

It will now be apparent that this transformer converter is of simple construction and contains only one moving part, the brush assembly and rotating member of the synchronous motor, which rotating part is comparatively small and of light weight. The apparatus is compact and entirely inclosed, although the parts are easily accessible and capable of removal and replacement by merely taking off the cover plate 23. The machine will automatically deliver direct current of a constant polarity and constant voltage, and this voltage can be readily adjusted by merely shifting the operating lever 26 to a new position along the rack 29.

While one specific example of a transformer converter built according to the principles of this invention has been described, it will be apparent that a wide variety of structural changes could be made, and that the character of the field and armature windings could be varied without departing from the principle of operation as herein disclosed. All such changes are contemplated as being within the scope of the claims which follow.

We claim:

1. A transformer-converter comprising a primary element in the form of an annular alternating current field-stator and a secondary element in the form of an armature stator enclosed within the field stator both fixedly mounted about a vertical axis, a fixed commutator centered about this axis and mounted above the armature, the commutator comprising an annular series of segments with their contact faces presented upwardly in a horizontal plane, a synchronous motor mounted above the stator elements and comprising a member mounted for rotation about the vertical axis, a plurality of downwardly projecting brushes carried by the rotary member and engaging the commutator, and means comprising slip rings on the rotary member and fixed brushes for taking off direct current.

2. A transformer converter comprising a primary element in the form of an annular alternating current field stator and a secondary element in the form of an armature stator enclosed within the field-stator both fixedly mounted about a vertical axis, a fixed commutator centered about this axis and mounted above the armature, the commutator comprising an annular series of segments with their contact faces presented upwardly in a horizontal plane, a synchronous motor mounted above the stator elements and comprising a member mounted for rotation about the vertical axis, a plurality of downwardly projecting brushes carried by the rotary member and engaging the commutator, means comprising slip rings on the rotary member and fixed brushes for taking off direct current, a casing enclosing the stator elements and adapted to hold a body of oil in which the stator elements are immersed, and a casing supporting the fixed elements of the synchronous motor and angularly adjustable upon the first mentioned casing about the vertical axis.

3. A transformer converter comprising a primary element in the form of an annular alternating current field-stator and a secondary element in the form of an armature stator enclosed within the field-stator both fixedly mounted about a vertical axis, a fixed commutator centered about this axis and mounted above the armature, the commutator comprising an annular series of segments with their contact faces presented upwardly in a horizontal plane, a synchronous motor mounted above the stator elements and comprising a member mounted for rotation about the vertical axis, a plurality of downwardly projecting brushes carried by the rotary member and engaging the commutator, means comprising slip rings on the rotary member and engaging the commutator for taking direct current from the armature, and means for feeding direct current of proper polarity from this source to the synchronous motor.

HARRY E. PATRICK.
IRVEN WILLIAM KURETH.